Jan. 7, 1969 R. D. HIPP, JR 3,419,987
SLIDE AND METHOD OF USING
Filed June 14, 1966

INVENTOR
RICHARD D. HIPP, JR.
Carpenter, Kinney + Coulter
ATTORNEYS

United States Patent Office 3,419,987
Patented Jan. 7, 1969

3,419,987
SLIDE AND METHOD OF USING
Richard D. Hipp, Jr., Circle Pines, Minn., assignor to Minnesota Mining and Manufacturing Company, St. Paul, Minn., a corporation of Delaware
Filed June 14, 1966, Ser. No. 557,487
U.S. Cl. 40—152       12 Claims
Int. Cl. G09f 1/12

ABSTRACT OF THE DISCLOSURE

Slides for display of graphic material are provided with external slideways for inter-engagement with adjacent slides to form an integral pack of slides from which single slides may be temporarily slidably removed for display and re-insertion as desired.

---

This invention relates to the mounting and displaying of graphic materials and, while not restricted thereto, finds particular utility in connection with the mounting and displaying of colored film slides and other photographic transparencies. There is provided a simple but rugged slide mount in which a transparency is quickly mounted and firmly held while still being easily removed when desired. The mount supports and protects the transparency and in conjunction with other similar mounts serves as a means for assembling and progressively displaying a desired series of transparencies. Individual mounts are easily removed or added without requiring relocation or other mounts or transparencies.

Figure 1:
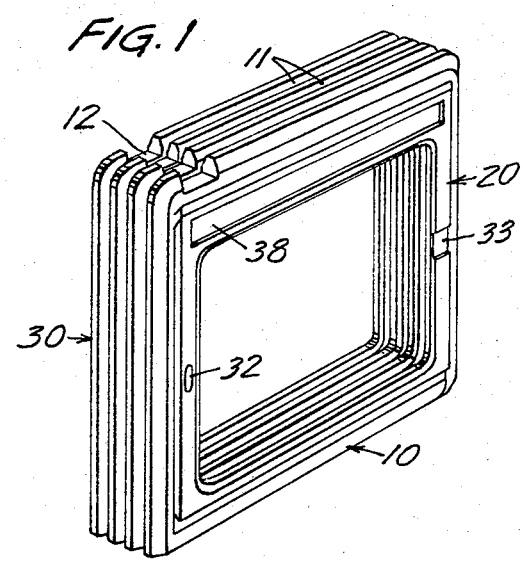
Figures 6, 7:
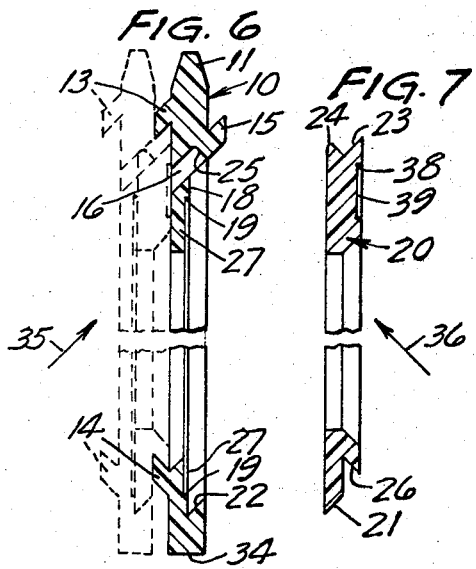
Figures 2, 3:
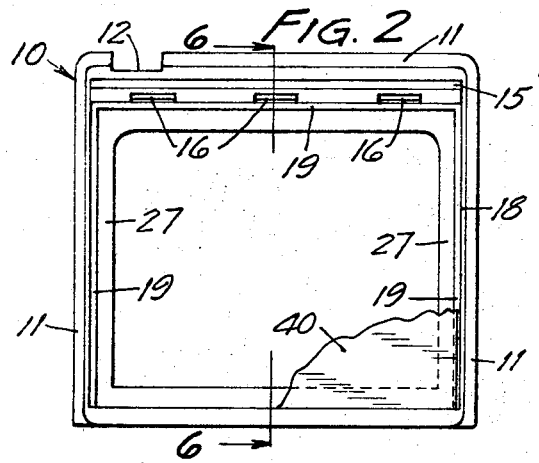
Figures 4, 5:
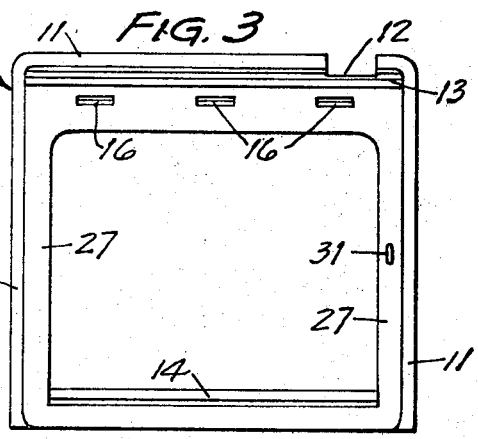

These and other advantages are secured, in accordance with the principles of the invention, with a slidably interconnected series of open-centered mounts or frames of which an illustrative embodiment will now be described in connection with the appended drawing, in which FIGURE 1 represents an assembly or stack of frames, shown in perspective, FIGURES 2 and 3 are face and back plan views respectively of an outer frame element, FIGURES 4 and 5 are back and face plan views respectively of an inner frame element, FIGURE 6 is a partial sectional view of the element of FIGURES 2 and 3 taken along line 6—6 of FIGURE 2, and FIGURE 7 is a partial sectional sectional view of the element of FIGURES 4 and 5 taken along line 7—7 of FIGURE 5.

The frame 10 of FIGURES 2, 3 and 6 is generally rectangular. The upper edge as seen in the several figures is in the form of an extender rack tooth 11, and is slotted near one end as indicated at 12, for purposes subsequently to be described. Two angularly opposing longitudinal ridges or fins 13 and 14 extend along the back side of the upper and lower horizontal members of the frame 10. A further longitudinal fin 15 extends along the face side of the upper horizontal member. A series of channels or recesses 16 extend through the upper member and into the fin 15. The front of the frame 10 is recessed to receive the inner frame 20, the remaining thin back web being further lightly recessed and providing an outer rim 18, a stepped edge 19, and an inner rim 27.

The inner frame 20 fits within the recessed open center of the outer frame 10, the slanted lower edge 21 lying within a cooperating retaining trough 22 in the inner lower edge of the outer frame, and the slanted upper edge 23 fitting against the slanted lower surface of the fin 15, with the elongate rounded projections 24 entering the openings 16 and forming a snap fit with the inner surface 25. The inner frame also carries along its lower horizontal member a longitudinal fin 26 outlining the edge of the open center of the frame element and in angular opposition to the slant face 23 and the working upper face of the fin 15.

A transparency cut to proper dimensions is mounted in the frame by dropping it into the open face of the outer frame 10, placing the inner frame 20 in position over the opening and with the lower slant edge 21 within the trough 22, and then pressing the upper edge into closed position. The resiliency of the frame members permits the projections 24 to snap into the recesses 16 and against the inner faces 25 to hold the inner frame member 20 firmly in position and against the enclosed transparency. The close snap fit provides increased rigidity in the assembled frame.

Ordinarily a photographic transparency will be trimmed so as to lie within the recess in the outer frame and supported on the outer continuous planar rim surface 18 beyond the edge 19, as indicated for the segment 40 in FIGURE 2. For such applications the clearances between the several mating surfaces will be adjusted to permit the frame to receive the film thickness without undue strain. Films of greater thickness may be trimmed to lie within the area bounded by the edge 19 and in contact with the planar rim surface 27. In extreme cases a succession of similar steps or film support levels may be provided, to receive transparencies of successively increased thickness and decreaed areas. One or both of the frame members may be very slightly inwardly bowed to provide increased compressive stress along the side edges of the insert when the mount is closed.

Once a number of transparencies has been mounted, the individual frames are next fitted together into a stack 30, illustrated in FIGURE 1. Assembly is by sliding transversely of the length of the stack, the fins 15 and 26 of one frame constituting a tenon and cooperatively fitting against the working surfaces of the mortise defined by the slanted retaining fins 13 and 14 of the frame next adjacent to provide a dovetail connection. The cooperating position of an adjacent mount is shown in outline in FIGURE 6. Any desired number of frames may thus be assembled to provide a continuous integral stack or block. The stack may be made of any desired length, and may be separated between any two adjacent frames, e.g. for removal or insertion of one or more frames or to obtain a stack of a desired lesser number of frames for convenience in handling or storing. The slots 12 provide convenient pressure faces for applying sliding forces to the individual frames in removing them from, and replacing them in, the stack.

The stack may be provided with protective terminal members similar to the slide mounts but in which the inner frame element has no center opening; the insertion of blank film or heavy paper in the two end mounts of a stack serves the same purpose, providing an effective dust cover as well as an area suitable for carrying additional identifying markings.

Once the frames have been assembled in a stack in face-to-face cooperative interlocking sliding engagement as shown in FIGURES 1 and 6, they are removably retained in position by means of a small ridge-like projection 31 on the back of the outer frame member 10 mating with a cooperating trough-like depression 32 in the face of the next adjacent inner frame member 20. A shallow trough 33 in the opposite vertical leg of the inner frame permits the opposing projection to be slid across that leg when necessary.

It will be understood that where reference is made herein to bottom and top members, horizontal positions, and the like, these positions refer to the drawings rather than to the device itself, since the frames and stack may be held equally well in any position. Indeed, for such purposes as the home showing of colored transparencies by projection of light-images, the stack of FIGURE 1 is preferably supported in the projector with the slotted edges 11 at the bottom. The stack then rests on a flat base or slide surface and is moved longitudinally in either direction by a pinion gear or equivalent mechanism, the edges 11 forming a rack, thus providing a rack-and-pinion drive. Individual frames are slid from the stack into position for projection, and returned to the stack, by a lever or cam which fits within the slot 12 of fthe appropriate frame. Alternatively, each edge 11 may be formed into a series of gear teeth serving as a rack by which the frame may be driven from and into the stack with the aid of an intermeshing pinion gear in place of such lever or cam.

With the stack in the position just indicated, the flat edges 34 shown at the bottom in FIGURE 6 will be at the top in position for viewing and may be used to carry identifying indicia. For this purpose the surface may be roughened or otherwise suitably treated, e.g. to permit marking with pen or pencil, or for reception of an adhesive label, and may if desired be widened to the full extent permitted by the effective thickness of the frame in the stack.

The upper outer face of the inner frame 20 is desirably provided with a shallow depression 38 having a roughened bottom surface 39, for further identifying markings with pencil or application of adhesive label or the like.

Although the frame components must be sufficiently resilient to permit snap fitting during assembly, the assembled mount is surprisingly rigid and therefore provides excellent protection to the enclosed transparencies and continued accuracy in image projection. The components are conveniently produced, by injection molding techniques, from plastic molding materials such for example as high impact polystyrene or preferably "Cycolac" acrylonitrile-butadiene-styrene terpolymer.

A particular advantage of the structure here described is the ease and speed with which the mount components may be produced by injection molding, using a simple two-part mold. As an example, a mold is prepared having a wedge-shaped central component and a mating V-shaped outer component. The mating faces are provided with depressions which together enclose openings defining the outer and inner frame members, connected by a sprue hole across the narrow end of the wedge-shaped center. With the closed mold in vertical position, the mating faces are at opposing angles of 45 degrees with the vertical, and the several slant surfaces of the resulting frame members, which are at an angle of 45 degrees with respect to the plane of the frame, are therefore each in vertical or horizontal position. As a result, the two pieces of the mold may be separated by movement along their common axis and the frame members may be withdrawn from the mold in the same direction. The direction of movement of the elements 10 and 20 from their respective mold cavities is indicated in FIGURES 6 and 7 by the arrows 35 and 36 respectively.

What is claimed is as follows:

1. A slide mount suitable for assembly with additional mounts and comprising outer and inner frame elements having opposing planar inner transparency-supporting marginal areas and having cooperating snap fastener means for retaining the two elements under compression against a film or slide supported therebetween, at least the outer element being open-centered, said mount being provided with upper and lower parallel opposing elongate ridge means on each outer face defining a mortise on one face and a corresponding tenon on the other face in position for cooperative interlocking sliding dovetail engagement with the ridge means on the opposing outer face of a next adjacent slide mount.

2. A slide mount as defined in claim 1 and including snap means for releasably retaining a said next adjacent slidably engaged mount in congruent position.

3. A slide mount as defined in claim 1 wherein said outer frame element includes a retaining trough along one edge of the open center and a plurality of recesses along the opposing edge, and wherein said inner frame element includes a slanted outer edge fitting within said trough and, along the opposing outer edge, a plurality of projections in position for, and capable of, being snap fitted within said recesses.

4. A slide mount as defined in claim 3 wherein all working faces of said ridges, recesses, trough and projections are disposed at an angle of approximately 45 degrees to the plane of the transparency-supporting areas whereby to permit molding of the frame elements in, and release from, a two-part mold.

5. A slide mount as defined in claim 1 wherein both outer and inner frame elements are open-centered, said mount containing a flat transparency mounted therein.

6. A slide mount as defined in claim 1 including means at one edge thereof for engagement with a force-supplying mechanism for sliding said mount into or out of assembly with adjacent mounts.

7. A slide mount as defined in claim 1 having a flat lebel-receptive outer surface area.

8. A slide mount as defined in claim 1 and suitable for the mounting of a projection transparency and for side-by-side assembly with additional mounts to form an integral stack of mounts; said mount comprising an outer and an inner open-centered frame element; said outer frame element being recessed at its face to receive said inner frame element and having a series of stepped planar inner transparency-supporting marginal areas, a retaining trough along one inner edge adjacent said marginal areas, and a first elongate ridge extending from the face side adjacent the inner edge opposite said trough, said opposite inner edge being recessed at a plurality of uniformly spaced locations, the several recesses extending into said ridge and through said element, said outer frame element being further provided on its back surface with upper and lower parallel opposing elongate ridges; said inner frame element fitting within the recessed outer frame element and having a continuous planar transparency-contacting marginal area, a slanted outer edge fitting within said trough, an opposite slanted edge fitting against said first elongate ridge and carrying a plurality of projections having inner faces normal to said opposite slanted edge for providing a snap fit within said plurality of recesses, and a further opposed slant ridge outlining the edge of the open center of said element across from said opposite slanted edge; and wherein all working faces of said ridges, recesses, trough and projections are disposed at an angle of approximately 45 degrees to the plane of the transparency-supporting area.

9. Method of handling transparencies for projection of light-images comprising mounting said transparencies each in a slide mount having on each face thereof means for slidably engaging the contacting opposite face of another said mount, and slidably assembling a plurality of the thus mounted transparencies into an integral stack and separately slidably temporarily offsetting individual ones of said mounted transparencies from said stack for projection of a light-image thereof.

10. Method as defined in claim 9 and including the further steps of advancing said stack longitudinally to a desired position, and then temporarily sliding an individual mounted transparency from said stack to a transversely offset position for viewing.

11. A stack comprising a plurality of slide mounts each as defined in claim 1 and assembled in cooperative face-to-face interlocking sliding engagement.

12. A slide member provided with display material and adapted for assembly with additional slide members into an integral pack of individually slidably removable and replaceable slide members, said slide member comprising a flat thin body member having upper and lower parallel opposing elongate ridge means on each outer face, said ridge means defining a mortise on one face and a corresponding tenon on the other face in position for cooperative interlocking sliding dovetail engagement with the ridge means on the opposing outer faces of next adjacent of said additional slide members.

References Cited

UNITED STATES PATENTS

| 2,528,366 | 10/1950 | Houston | 40—152 X |
| 2,837,854 | 6/1958 | Bing et al. | 40—152 |
| 3,300,886 | 1/1967 | Donofrio | 40—152 |

EUGENE R. CAPOZIO, *Primary Examiner.*

W. J. CONTRERAS, *Assistant Examiner.*

U.S. Cl. X.R.

40—64